May 23, 1939.  M. KLEIN ET AL  2,159,702
COMBINED INDICATOR AND ELECTRICAL CIRCUIT CONTROLLER
Filed Oct. 3, 1935  2 Sheets-Sheet 1
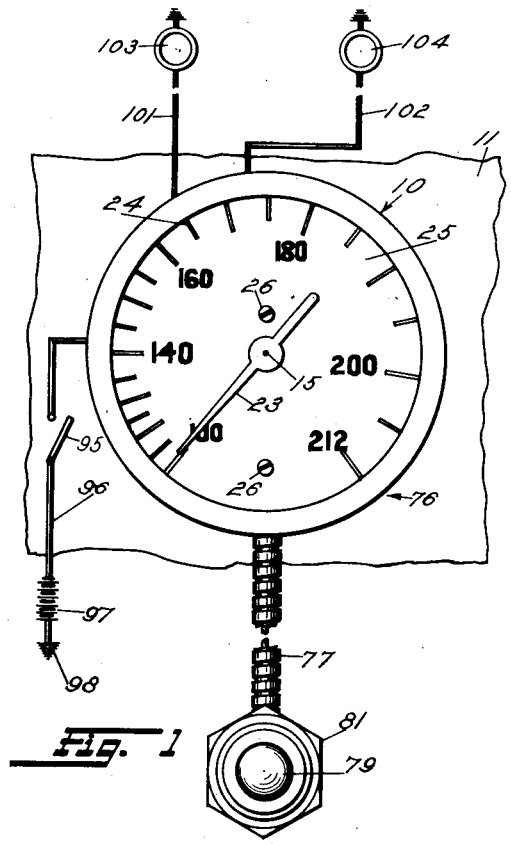
Fig. 1
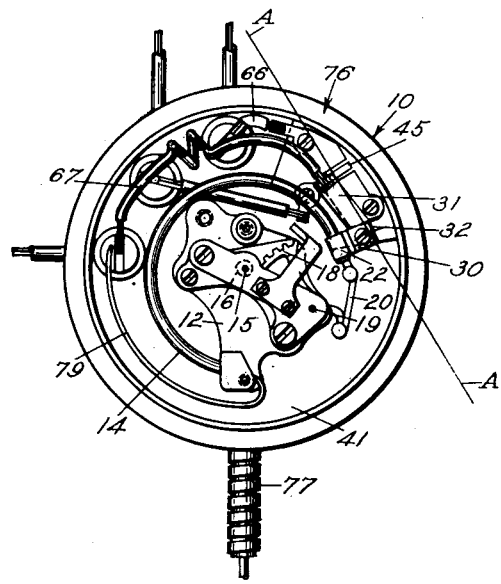
Fig. 2
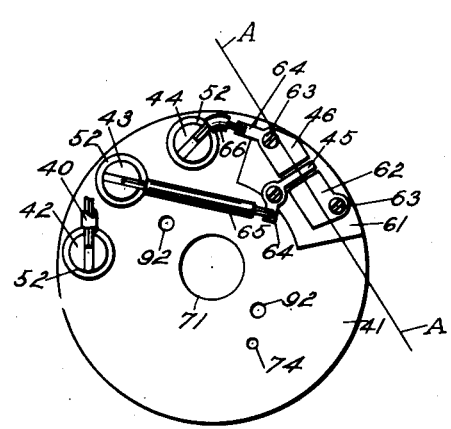
Fig. 3
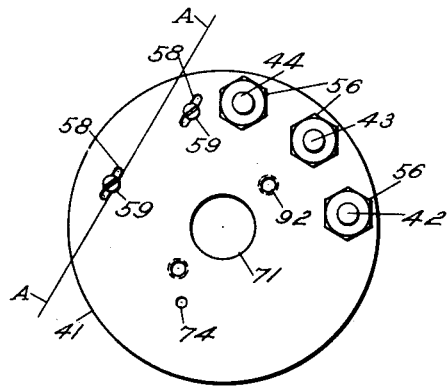
Fig. 4
Fig. 5
Inventor
Maximilian Klein
Bernhard Willach
By Strauch & Hoffman
Attorneys May 23, 1939.　　M. KLEIN ET AL　　2,159,702
COMBINED INDICATOR AND ELECTRICAL CIRCUIT CONTROLLER
Filed Oct. 3, 1935　　2 Sheets-Sheet 2
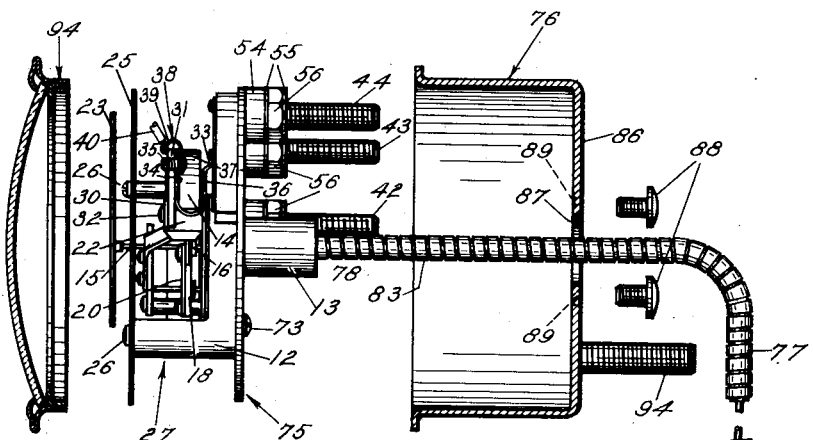
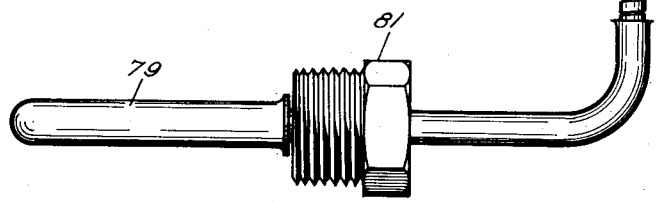
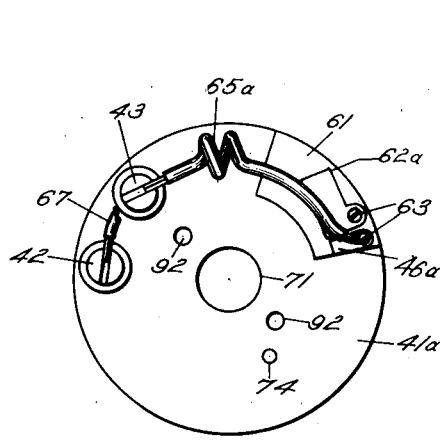
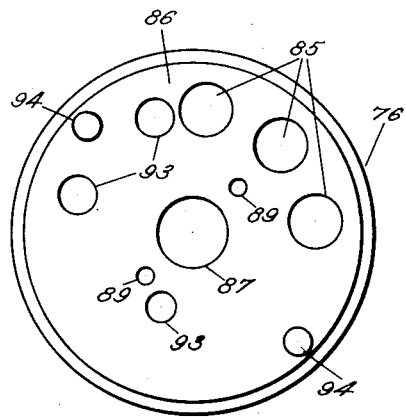
Inventor
Maximilian Klein
Bernhard Willach
By Strauch + Hoffman
Attorneys Patented May 23, 1939

2,159,702

UNITED STATES PATENT OFFICE 2,159,702

COMBINED INDICATOR AND ELECTRICAL CIRCUIT CONTROLLER

Maximilian Klein and Bernhard Willach, Sellersville, Pa., assignors to United States Gauge Company, Sellersville, Pa., a corporation of Pennsylvania Application October 3, 1935, Serial No. 43,432

8 Claims. (Cl. 200—56)

The present invention relates to temperature or pressure indicating instruments which are provided with means for controlling an electrical indicating system, and more particularly to an instrument designed to indicate the temperature of the cooling medium of an internal combustion engine or the pressure in the oil line of said engine and at the same time control an electrical system which is designed to quickly advise the operator of a critical condition of the cooling medium or the critical insufficiency of oil in the crankcase.

In the operation of modern automotive vehicles the desirability of strikingly indicating abnormal temperature or pressure conditions of the internal combustion engine in a manner that is certain to be quickly and easily seen by the operator is evident. One way of readily accomplishing this is by employing electrical indicator lights of varying colors, which lights are controlled by the temperature or pressure instruments provided as standard equipment.

It is the primary object of the present invention to embody, in a standard temperature or pressure instrument an electrical circuit controller designed to control a circuit including indicator lights, for example, in such a way as to provide a simple, compact structure capable of accomplishing the dual functions just referred to with efficiency and accuracy.

Another object of the present invention resides in the provision of a combination instrument of the above mentioned character wherein the temperature or pressure recording unit and the signal control unit are connected to form a unitary assembly capable of ready insertion in a single or unitary housing or casing.

A further object of the present invention resides in the provision of an instrument in which the connection of the pressure gauge unit and the control unit in operative relation and the making of all necessary adjustments may be made at the factory and prior to insertion of the combined unit in the casing and prior to shipment.

A still further object of the present invention resides in providing means for securing the gauge unit and contact unit together in such a manner that either may be replaced or repaired with great facility.

A further object of the present invention resides in a unitary assembly of the pressure responsive unit and the circuit control mechanism in order that the combined unit may be secured in its housing by a single set of securing elements which upon removal give access to both units.

Still another object of the present invention resides in providing a standard pressure gauge with an adjunctive circuit control unit without altering the elements of the pressure gauge, whereby the cost of the combination instrument is reduced.

Another object of the present invention resides in providing a pressure gauge with contacts which are permanently secured in definite spaced relation upon an insulating block adjustably carried on a contact plate.

A further object of the present invention resides in providing the pressure responsive element of a pressure gauge with a contact designed to cooperate with spaced contacts disposed between the pressure responsive element and the wall of the enclosing housing and in the normal path of movement of said element.

A still further object of the present invention resides in providing the pressure responsive element of a gauge with a contact designed to move in a definite path, determined by the movement of the pressure responsive element, into cooperative engagement with a set of contacts designed to be selectively positioned in the path of the movable contact.

Further objects will appear from the description and appended claims when studied in conjunction with the attached drawings wherein:

Figure 1 is a view showing the instrument of the present invention connected in a preferred manner in an electric signaling circuit;

Figure 2 is a front view of the instrument shown in Figure 1 with the face and dial thereof removed to expose the pressure and circuit control elements in order to more clearly show their cooperative relation;

Figure 3 is a front plan view of the contact plate of the circuit control unit of Figure 2;

Figure 4 is a back plan view of the contact plate of Figure 3 disclosing the novel means provided for adjusting the contacts with respect to the contact plate;

Figure 5 is an elevational view of a centering washer used on the contact plate of Figure 3;

Figure 6 is an exploded view of the instrument shown in Figure 2 with the parts thereof disposed in the positions they assume during the assembly of the instrument;

Figure 7 is a rear view of the housing provided for the instrument shown in Figures 1-6; and Figure 8 is a front plan view of a modified form of control plate adapted to be substituted for the plate of Figure 2.

With continued reference to the drawings wherein like reference numerals are employed to designate the same parts throughout the several figures, the numeral 10 indicates generally the instrument provided by the present invention.

Although instrument 10 of the present invention is capable of use wherever a combination instrument of the character mentioned may be desired, it is illustrated and described in its present preferred use as a temperature or pressure indicator for use with an internal combustion engine.

Referring now to Figures 1-7, a supporting frame 12 having a rearwardly extending annular boss 13 has one end of a Bourdon tube 14 secured thereto in well known manner. Frame 12 and boss 13 are provided with suitable passages (not shown) designed to communicate with the bore of Bourdon tube 14.

Frame 12 rotatably supports an arbor 15 having a gear 16 carried thereon. A gear sector 18 pivoted at 19 cooperates with gear 16 and is connected, as by a suitable multiplying linkage 20, to the free end 22 of Bourdon tube 14. A pointer 23 is suitably secured to the end of arbor 15 and cooperates in a well known manner with graduations 24 provided on the face of a dial 25. Dial 25 is secured to frame 12 by means of screws 26.

The structure so far described provides a unitary gauge structure 27 of simple, practicable and compact design. By providing the proper connections unit 27 may be used in the conventional manner to indicate either the temperature or pressure of a medium. Since the unit 27 is known in the art and its operation is well understood a detailed description will be omitted.

The structure provided for controlling the electrical circuit is associated with the standard gauge construction just described in a manner which will now be described. An inverted L-shaped supporting member 30 is secured to the free end 22 of Bourdon tube 14 by soldering, brazing, welding or in any other suitable manner. An elongated rectangular-shaped insulating block 31 formed of any suitable electrical insulating material is secured at one end to member 30 by means of a short screw 32. Block 31, as seen from Figures 2 and 6, projects back from end 22 of Bourdon tube 14 to form a support for a movable contact 33.

Contact 33 is preferably formed of flat spring metal bent into U-shaped form. One leg 34 of contact 33 is secured to the free end of block 31 by means of a screw 35. The other leg 36 of contact 33 is free and is designed to cooperate with stationary contacts to be hereinafter described.

Screw 35 also secures one leg 37 of an inverted U-shaped metal strip 38 to the free end of block 31. Strip 38, as illustrated in the drawings, receives the free end of block 31 and the end of leg 34 of contact 33 between its legs 37 and 39. An insulated electrical conductor 40 is bared at one end and secured to leg 39 of strip 37 by means of solder or the like.

From the preceding description it will be seen that end 22 of Bourdon tube 14 is provided with an electrical contact which moves in a path determined by the flexing of Bourdon tube 14 in response to temperature changes, or if connected directly to a pressure line, pressure variations. The path of contact 33 is substantially along a straight line A—A, Figures 2, 3 and 4 of the drawings. Contact 33, as heretofore pointed out is electrically insulated from the Bourdon tube and is of sufficient width at its point of contact to prevent excessive heating of the contacts as the current passes therethrough. The surface contact provided by contact 33 also materially eliminates the possibility of arcing as it moves from one stationary contact to another.

A contact plate 41 having binding posts 42, 43 and 44 and contacts 45 and 46 is associated with frame 12. Binding posts 42, 43 and 44 are secured in spaced apertures provided adjacent the periphery of plate 41. Suitable fibre centering washers 52 encircle the shanks of binding posts 42, 43 and 44. Washers 52 are formed of insulating material and are provided with centrally disposed annular shoulders 53 (Figure 5). Binding posts 42, 43 and 44 are designed to snugly fit within apertures 53' provided in washers 52. Shoulders 53 are designed to snugly fit in apertures provided in plate 41 thereby insulating binding posts 42, 43 and 44 with respect to plate 41.

Insulating washers 54 are positioned upon the projecting shanks of binding posts 42, 43 and 44 and are adapted to contact the rear face of plate 41 adjacent the apertures therein. Thin metal washers 55 are inserted between washers 54 and suitable securing nuts 56 threaded on the binding posts 42, 43 and 44. Nuts 56 secure the binding posts to plate 41 and maintain binding posts 42, 43 and 44 in electrically insulated relation with respect to plate 41.

A pair of elongated slots 58 are formed in plate 41. Slots 58 are preferably disposed with their major axis parallel to line A—A of Figures 2, 3 and 4 for a purpose to be hereinafter pointed out. Suitable screws 59 are disposed in slots 58 with their heads abutting the rear of plate 41 and their shanks extending through plate 41. The threaded ends of screws 59 secure a block 61 of insulating material in place over the front of slots 58.

Contact plates 45 and 46 and a guide plate 62 are secured to block 61 in predetermined spaced relation by means of screws 63. Guide plate 62 is of a thickness equal to the thickness of contacts 45 and 46 and serves to maintain contact 33 at the level of contacts 45 and 46 whenever instrument 10 is in its inoperative position. Contacts 45 and 46 are provided with extensions 64 which are designed to have the bared ends of conductors 65 and 66 secured thereto by means of solder or the like. The opposite ends of conductors 65 and 66 are secured to the heads of binding posts 43 and 44 respectively by soldering the bared ends in the kerfs formed thereon. Conductor 40 is likewise connected to contact 33 and to the head of binding post 42.

A centrally disposed annular opening 71 designed to receive boss 13 of frame 12 is provided in plate 41. A screw 73 is freely received in an aperture 74 provided in plate 41 and is threaded into a suitably tapped opening in frame 12 to thereby secure the plate 41 upon frame 12. Since boss 13 and screw 73 are disposed in spaced relation in plate 41, the plate is prevented from movement in a circumferential direction as well as in an axial direction. Screw 73, therefore, secures gauge unit 27 and plate 41 with its associated binding posts and contacts together to form a unitary gauge and controller unit 75.

With unit 27 and plate 41 secured together in the above mentioned manner, a casing 76 is telescoped upon a capillary tube 77 of any suitable construction which is secured to boss 13 at 78 by means of solder or the like. The opposite end of capillary 77 is provided with a bulb 79 adapted to be secured in the path of cooling medium by an adapter plug 81. The gauge is filled with an expansible fluid in a manner well known in the art.

In the event that a pressure responsive instrument is desired the capillary 77 is omitted and the unit 27 is connected in any suitable manner to the source of pressure to be measured. The gauge unit 27 is then tested and pointer 23 adjusted. After adjustment of unit 27 the circuit control contacts are adjusted in the manner about to be described.

Conductors 65, 66 and 40 are preferably flexible in order that block 61 may be shifted back and forth within slots 58 causing contacts 45 and 46 to approach or recede from contact 33. The fact that contact 33 is constrained to move in the same direction as the slope of slots 58 provides an effective means for adjustment of the contacts. This novel adjustment permits instrument 10 to be used over different temperature ranges. Since the temperature range between the lowest desirable temperature and the highest desirable temperature is substantially the same in most internal combustion engines, it will be appreciated that the present invention provides a simple and efficient means for obtaining the initial setting of contacts 33 and 45 while at the same time retaining the desired interval between the contacts 45 and 46.

The relation of the different parts of instrument 10 as thus far described is clearly shown in Figure 6 of the drawings. The gauge and controller unit 75 is shown to the left of casing 76 which has been slipped over the end 83 of capillary 77 prior to the securing of end 83 to boss 13. Casing 76 is associated with unit 75 by moving the casing to the left in telescoping relation with unit 75. Binding posts 42, 43 and 44 pass freely through apertures 85 provided in wall 86 of casing 76. Washers 54 abut the edges of apertures 85 to insulate casing 76 from the binding posts 42, 43 and 44. Boss 13 extends through an aperture 87 provided in casing 76.

Suitable machine screws 88 pass freely through apertures 89 in wall 86 and apertures 92 in plate 41 into screw threaded engagement in tapped apertures in frame 12 to secure the unit 75 within casing 76. The heads of screws 59 and 73 are disposed centrally in suitable apertures 93 formed in casing 76 in order that plate 41 may lie flush against the inner face of wall 86. The front of casing 76 is closed by means of a crystal and bezel construction 94 in well known manner.

In its final assembled relation instrument 10 is inserted and secured in instrument board 11 by means of screws 94. Screws 94 are secured to wall 86 by welding or the like. Binding posts 42, 43 and 44 extend to the rear of casing 76 and are connected to an electrical circuit in the following manner. Binding post 42 is connected to an electrical conductor 96 which is in turn connected through an ignition switch 95 to a suitable source of electrical energy such as a battery 97 which is grounded at 98. Binding posts 43 and 44 are connected by means of conductors 101 and 102 to indicator lights 103 and 104 which constitute safe and danger signals respectively. In the present preferred embodiment, light 103 is provided with a green lens, and light 104 with a red lens. Indicator lights 103 and 104 are preferably positioned on the instrument panel 11 although they may be placed in any other convenient location where they may be observed by the operator of the vehicle.

The operation of the instrument of the present invention is as follows: With bulb 79 connected in the cooling system of an internal combustion engine and Bourdon tube 14 in its normal or inoperative position, and the contact 33 resting on guide plate 62, the switch 95 is closed and the engine is started causing the temperature of the cooling medium to rise. The rise in temperature of the cooling water is transmitted to the expansible fluid in bulb 79 and capillary 77, causing Bourdon tube 14 to flex and move contact 33 into engagement with contact 45. In the present preferred disclosure the contacts 33 and 45 engage when pointer 23 indicates a temperature of about 160° F. Green light 103 is consequently lighted and remains lighted until the temperature exceeds 200° F. thus advising the operator that his engine is operating within a satisfactory temperature range. It will be clear that all that the operator need do to determine this fact is to glance at the lights and as a consequence the relatively difficult reading of scale 24 is obviated.

If the temperature exceeds 200° F., Bourdon tube 14 flexes sufficiently for contact 33 to pass out of engagement with contact 45 and into engagement with contact 46 thereby lighting the red indicator light 104. When red light 104 lights, the operator is immediately warned that an abnormal operating temperature has been reached by his motor. He can then stop and investigate to determine the cause of the abnormal condition before any damage is done. In the present preferred form contact 46 is of sufficient length to maintain light 104 lighted until a temperature of 212° F. is reached. As the temperature decreases the movement of contact 33 is reversed and returns to its inoperative position on guide plate 62 at which time switch 95 may be actuated to break the circuit through instrument 10, thereby assuring the extinguishment of indicator lights 103 and 104.

From the above description it will be seen that the present invention provides a very simple, yet efficient, instrument for indicating the temperature or pressure of a medium and operating an indicator system, which quickly advises an operator of the condition of the machine. This indication and signalling is accomplished without the necessity of resorting to the reading of a graduated dial or the like. The instrument of the present invention permits the incorporation of such a system wherever its use may be desirable with only a very slight increase in cost. It will also be apparent that with the present novel construction the standard gauges now in use may be conveniently modified to incorporate the system above described by the addition of an adjunct in the form of a contact plate.

A modified form of contact plate 41 is shown in Figure 8 at 41a. Plate 41a is designed for use in indicating the pressure in an internal combustion engine oiling system or the like. In this form of the invention only one light is used, preferably a red light. As a consequence only one stationary contact is provided. The light in the present modification is designed to light when the oil pressure drops below a certain predetermined pressure.

Plate 41a is provided with central aperture 71 and apertures 74 and 92 in the same manner as plate 41. Slots 58 and screws 59 are also provided and positioned in the same manner as in the preferred embodiment of the invention. Only two binding posts 42 and 43 are provided in this form of the invention. Binding post 42 is connected by means of conductor 67 to movable contact 33 in the manner heretofore described.

Binding post 43 is connected by means of conductor 65a to contact 46a which is secured to block 61 by means of screw 63. A guide plate 62a is secured to block 61 by means of screw 63 and serves the same purpose as guide plate 62 in the previously described form of the invention. In the present modification contact 46a is so disposed that the light associated with contact 46a will be lighted when Bourdon tube 14 is in its zero position or a position corresponding to a pressure less than the predetermined danger pressure. Switch 95, utilized in conjunction with the present form of the invention, extinguishes light 104 when the ignition is turned off and the modified indicator is not in use.

Plate 41a is secured to frame 12 in the manner heretofore described. Unit 75 provided thereby is assembled in the same manner as unit 75 of Figures 1-7 except that capillary 77 and bulb 79 are dispensed with and boss 26 is connected in any suitable manner to the pressure line. The operation of this form of the invention is believed to be readily understood from the above description.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A combined indicator and circuit controller comprising a casing having a cylindrical wall, a Bourdon spring within said casing in spaced relation to said wall, a contact fixed to the end of said spring, an indicator mechanism within said spring operatively connecting said spring and indicator, contact elements secured within said casing and designed to be engaged by the contact on said spring upon movement of said Bourdon spring, said elements being disposed outside of said Bourdon spring and in the space between said Bourdon spring and said wall.

2. A combined pressure indicator and circuit controller comprising an indicator mechanism including a Bourdon spring having a contact thereon, a support for said mechanism, a cup-shaped casing for said support and mechanism, a circuit controller including a contact plate secured to said support and disposed between said support and the bottom of said cup-shaped casing, and contacts on said plate designed for cooperation with said first mentioned contact.

3. In combination, a support, a Bourdon spring adapted to respond to pressure variations secured to said support, a contact secured to the movable end of said Bourdon spring, a dial plate secured in front of said support in spaced relation thereto, a pointer designed to cooperate with said dial plate, actuating means interconnecting said pointer and said Bourdon spring connected to said support and disposed between said dial and the support, a contact plate secured to the back of said support, contacts carried by said contact plate adjacent the path of movement of said movable end of said Bourdon tube for cooperation with said contact on said Bourdon spring in response to pressure variations.

4. In an instrument designed to indicate temperature or pressure variations and control an electrical circuit having signal lights adapted to indicate normal and abnormal temperatures or pressures; a supporting frame; a Bourdon tube attached to said frame and designed to respond to temperature or pressure variations in an external medium, an indicator, and mechanism secured from one side of said frame and operatively connecting said tube and indicator; a contact plate secured to said frame from the other side thereof and carrying contacts, said contact plate cooperating with said Bourdon tube, said indicator and said mechanism to form a unitary assembly; a casing designed to house said unitary assembly, and means for securing said unitary assembly in said casing.

5. In an instrument designed to indicate temperature or pressure variations and control an electrical circuit adapted to indicate normal and abnormal temperatures or pressures, a Bourdon tube designed to respond to temperature or pressure changes, a frame supporting said Bourdon tube, means for connecting said Bourdon tube to a medium the temperature or pressure of which varies, a contact plate having slots therein secured to said frame to form a unitary assembly, a threaded member designed to be freely received in said slots, an insulating block carried by said members, contacts secured to said insulating block, a contact carried by the free end of said Bourdon tube and designed to move in a path determined by the flexing of said Bourdon tube to engage said first mentioned contacts, said slots and said threaded members cooperating to permit said block and its associated contacts to be moved along the path of movement of said last mentioned contact to thereby vary the point of engagement of said contacts.

6. An automobile thermometer and indicator controller comprising a temperature responsive element designed for movement in response to changes in the temperature of the internal combustion engine cooling fluid, a contact secured to said element for movement in a predetermined path, a plurality of contacts disposed along the path of movement of said movable contact and means comprising elongated slots designed to receive said plurality of contacts, said slots being disposed with their major axis paralleling the path of said movable contact whereby said plurality of contacts may be selectively positioned in said path to permit the adjustment of the contacts for operating at different temperatures.

7. In combination, a Bourdon tube having an electrical contact adjacent its movable end and a contact plate having electrical contacts designed to cooperate with said first mentioned contact; said last mentioned contacts being adjustably carried in elongated slots paralleling the direction of movement of said end to permit adjustment of said last mentioned contacts with respect to said first mentioned contact to thereby selectively predetermine the position at which said first mentioned contact engages said last mentioned contacts.

8. A circuit controller for use with a temperature or pressure responsive gauge, comprising a plate having a plurality of apertures therein, binding posts secured in certain of said apertures provided adjacent the periphery of said plate, an insulating block adjustably secured in certain other apertures formed adjacent the periphery of said plate, contacts carried by said insulating block and flexible electrical conductors adapted to connect said contacts to said binding posts, said conductors being designed to lie adjacent one face of said plate permitting said gauge to be secured on said face without interfering with the conductors.

MAXIMILIAN KLEIN.
BERNHARD WILLACH.